May 13, 1958

J. M. BOOE 2,834,926

TANTALUM ELECTROLYTIC CAPACITOR WITH
IRON CHLORIDE DEPOLARIZER

Filed Nov. 16, 1954

INVENTOR
James M. Booe
BY
ATTORNEY

United States Patent Office 2,834,926
Patented May 13, 1958

2,834,926

TANTALUM ELECTROLYTIC CAPACITOR WITH IRON CHLORIDE DEPOLARIZER

James M. Booe, Indianapolis, Ind., assignor to P. R. Mallory & Co., Inc., Indianapolis, Ind., a corporation of Delaware Application November 16, 1954, Serial No. 469,094

12 Claims. (Cl. 317—230)

This invention relates to electrolytic capacitors, and, more particularly, to an improved electrolytic capacitor comprising an anode of tantalum having a dielectric film formed thereon.

In my Patent No. 2,616,953, I have disclosed and claimed an electrolytic capacitor comprising an anode of tantalum, a cathode of silver, and an electrolyte of sulfuric acid. This capacitor was of the "platable metal" type, operating on the principle of electrolytically dissolving silver from the cathode when current was flowing through the capacitor in one direction and electrolytically depositing silver on the said cathode from ions in the electrolyte when current was flowing through the capacitor in the opposite direction. This dissolution and deposition of silver ions precluded the formation of gas films, corrosion films, and asymmetric conducting films on the cathode and thereby prevented or minimized losses in the capacitor. Although depolarization by this principle was highly effective, it may have certain limitations in capacitors of extremely small dimensions in which the anode and cathode may be spaced only a few thousandths of an inch apart. In such capacitors, continued deposition of metal on the cathode may result in this deposit reaching the anode, thereby producing a short circuit.

I have discovered a simple and completely satisfactory solution of the outstanding problem.

It is an object of the present invention to improve tantalum electrolytic capacitors.

It is another object of the invention to provide an electrolytic capacitor comprising an anode of tantalum, a cathode, an electrolyte, and a suitable depolarizer dissolved in said electrolyte.

It is a further object of the invention to provide a tantalum capacitor having a large amount of depolarizer material dissolved in the electrolyte thereof, which may be built in extremely small dimensions with relatively high capacity values and which may be readily manufactured and sold on a practical and commercial scale at a low cost.

Other and further objects and advantages of the present invention will become apparent from the following description, taken in conjunction with the accompanying drawing, in which.

Figure 1:
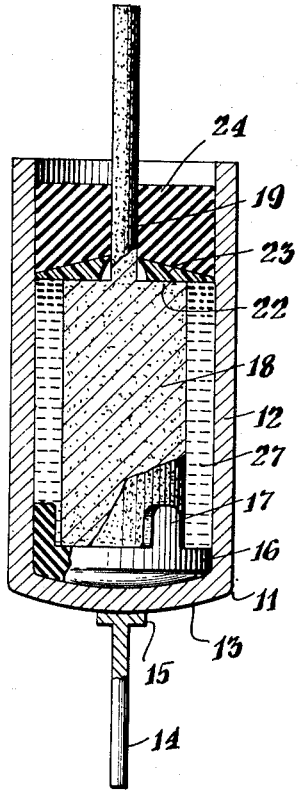
Fig. 1 is a vertical, sectional view of an electrolytic capacitor embodying the invention prior to spinning the top portion of the container.

Broadly stated, I have discovered that, in tantalum capacitors, depolarization at the cathode can be accomplished on the principle of reduction and oxidation of inorganic ions in the electrolyte and have found ferric and ferrous chlorides to be highly effective for this purpose. Large amounts of such depolarizer materials can be dissolved in the electrolyte solution, for example, the solubility of ferric chloride ($FeCl_3$) is reported as 740 grams per liter. Ferric chloride as a depolarizer is particularly advantageous in capacitors of extremely small dimensions and may be used in combination wtih a silver or gold cathode. The electrolyte is preferably a chloride of an alkali metal or hydrochloric acid in which the depolarizer is dissolved.

Ferric chloride ($FeCl_3$) alone has been found to be highly effective as a depolarizer in tantalum capacitors; however, its presence in the electrolyte only gives depolarization in the charging part of the alternating current cycle and also for the D. C. leakage current. In this case, the depolarization takes place by reduction of the ferric ion to the ferrous ion. It has also been found that more complete depolarization will be obtained if there is also present some ferrous chloride ($FeCl_2$) in the electrolyte to give depolarization in the receding part of the alternating current cycle or during discharge of the anode. Upon continued operation of the capacitor, however, primarily by the D. C. leakage current, ferrous chloride will be produced from the ferric chloride in sufficient quantity to be effective. For immediate maximum depolarization, a small amount of $FeCl_2$ may be added to the electrolyte along with a large amount of $FeCl_3$. For best results, the ranges of ferric and ferrous chloride concentrations are between 10 g. and 200 g. per liter and between 1 g. and 10 g. per liter, respectively.

As an example of the effectiveness of ferric and ferrous chlorides as a depolarizer, using a silver or gold cathode, the following test data are in evidence. An electrolyte of lithium chloride (10% solution) was used with and without iron chlorides and with different areas of silver and gold cathode. All tests were made with a porous tantalum anode having a capacitance of 78 mfd. when measured in 10% lithium chloride, with a silver cathode having an area of 20 sq. in.

*Silver cathode*

| Area of Silver Cathode | Capacitance | | |
|---|---|---|---|
| | LiCl | LiCl+FeCl$_3$ | LiCl+FeCl$_3$+FeCl$_2$ |
| .144 sq. in. | Mfd. 54 | Mfd. 68 | Mfd. 80 |
| .288 sq. in. | 62 | 70 | 82 |

*Gold cathode*

| Area of Gold Cathode | Capacitance | | |
|---|---|---|---|
| | LiCl | LiCl+FeCl$_3$ | LiCl+FeCl$_3$+FeCl$_2$ |
| .067 sq. in. | Mfd. 39 | Mfd. 65 | Mfd. 77 |
| .134 sq. in. | 44 | 72 | 82 |
| .200 sq. in. | 48 | 75 | 82 |

It will be noted from the foregoing tables that with the system of the invention, a substantial increase in capacitance was obtained when $FeCl_3$ was present in the electrolyte and an additional increase was obtained when both $FeCl_3$ and $FeCl_2$ were present in the electrolyte. It will be further noted that the capacitance obtained in lithium chloride electrolyte containing the iron chloride depolarizers of the invention with a silver cathode of only .144 sq. in. in area or with a gold cathode of only .134 sq. in. in area, was actually higher than the capacitance obtained with a silver cathode of 20 sq. in. in area in the same electrolyte in the absence of the said depolarizers.

In practice, an aqueous solution of the ferric and ferrous chlorides alone can be used to serve as both electrolyte and depolarizer. However, since the conductivity of this solution is not very high, it is preferable to use an electrolyte which is more conductive, such as the chlorides of the alkali metals or hydrochloric acid in which the iron chlorides are dissolved. The concentration of the electrolyte is not critical. It is desirable, however, to select such concentrations at which the electrical conductivity is the highest and the freezing temperature is the lowest. Thus, for hydrochloric acid, the preferred concentration is about 20% and, for lithium chloride, about 25%, corresponding to the maximum conductivity and to the minimum freezing temperature. In many cases an electrolyte of hydrochloric acid is more advantageous than lithium chloride, due to the fact that hydrochloric acid has better conductivity, particularly at low temperatures.

It appears that due to the very corrosive nature of ferric chloride, there is a superficial attack of this depolarizing agent on a silver cathode. This attack, however, is not prolonged and practically ceases within a relatively short time so that silver cathodes are entirely satisfactory for the purposes of the present invention. Gold appears to be free from this initial attack and for this reason may be a better choice of cathode material for certain applications, particularly as the provision of a thin gold plate on the silver cathode does not substantially increase the cost of the capacitor.

In order that those skilled in the art may have a better understanding of the invention, reference may be had to the accompanying drawing illustrating a practical embodiment of the invention into a commercial capacitor. The structural features of this capacitor are disclosed and claimed in a co-pending application of Bliss et al., Serial No. 356,356, filed May 21, 1953, and entitled "Electrolytic Capacitor," now Patent No. 2,758,258, granted August 7, 1956.

The capacitor shown in the drawing comprises a casing 11 made from fine silver sheet in the shape of an open-ended can or cup having a cylindrical side wall 12 interconnected by a curved bottom wall 13. Since casing 11 acts as the cathode of the capacitor, it may be gold-plated both internally and extenrnally in case a gold cathode is desired, a plate of about 0.0005 in. in thickness being satisfactory for the purpose. A cathode terminal wire 14 is secured to the casing in any suitable manner, such as by welding, as indicated at 15.

Fitted within container 11 is a bottom spacer 16 of polystyrene which comprises a three-legged clutching and alignment member including a central portion from which at spaced radial points extend arms 17 adapted to form a cradle or centering support for anode 18 so as to keep the same from touching the case. Anode 18 comprises a porous sintered cylindrical pellet of tantalum having a rod or riser of tantalum 19 integrally formed therewith. An anode terminal wire 20 is secured to riser 19 in any suitable manner, such as by welding, as indicated at 21. Over shoulder 22 of anode pellet 18 is seated top spacer 23 made of polystyrene. This spacer comprises a flat bottom surface through the center of which is bored a tapered aperture which is narrower at the top than at the bottom. Opposite to the bottom flat surface of spacer 23 is a top surface having a flat center section from which radiates a sloped surface. The annular circumference of spacer 23 abuts the inner wall of the casing of the capacitor to aid in centering and holding pellet 18.

Figure 2:
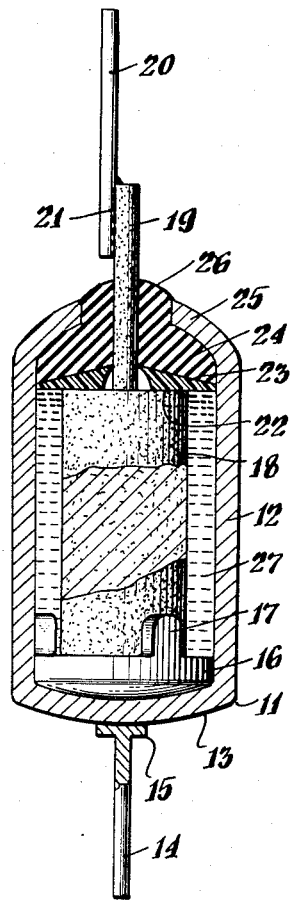
Fig. 2 is a similar view of the capacitor shown in Fig. 1 after complete assembly.
Figure 3:
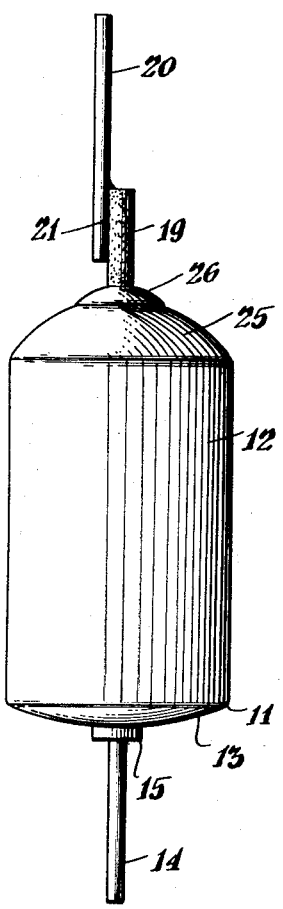
Fig. 3 is a side elevational view of the capacitor shown in Figs. 1 and 2.

Surmounting top spacer 23 is a gasket 24 made of a suitable elastomer, such as butyl rubber, which has good resistance to permanent set, is chemically inert to the electrolyte and is characterized by low gas permeability. When the case is crimped, as shown in Fig. 2, the heretofore open end of the case is closed to form an annular top 25 having its center closed by a collar 26 of extruded gasket material tightly surrounding anode riser 19 of tantalum. When the gasket material is extruded from the open end, it also presses down tightly against the top spacer. Since the top spacer rests on the anode, with the anode resting on the bottom spacer and the bottom spacer resting in turn on the case bottom, the force of the crimp is thus transferred to the bottom of the case. All the components are thus held very rigidly and compactly in place.

In assembling the capacitor, bottom spacer 16 is first placed within the case next to the bottom wall. The pellet subassembly including the top spacer 23 and gasket 24 then follows by placing the top spacer over the anode riser with the tapered side of the spacer being placed away from the pellet, and then placing the gasket over the riser. The case is next filled with the electrolyte 27 and the pellet assembly inserted within the case and the electrolyte. It is to be noted that the gasket must be below the lip of the case prior to crimping the same. The case is then crimped so as to extrude the gasket material and to allow it to flow out of the open center thereof and to grasp the anode riser tightly. The anode terminal wire 20 is then welded or otherwise secured to the anode riser.

A commercial tantalum capacitor of the described character, 7/32 in. in diameter and 3/8 in. long, comprising a tantalum anode, a fine silver cathode, and a sulfuric acid electrolyte, is rated 30 mfd. at 6 volts. The electrical characteristics of capacitors of identical structure but embodying the principles of the present invention, as measured with 3 volts A. C. will appear from the following tables:

Silver cathode

Capacitance at room temperature: Mfd.
    Unit #5, LiCl ------------------------------ 36.7
    Unit #6, LiCl+$FeCl_3$ ---------------------- 44.4
    Unit #7, LiCl+$FeCl_3$+$FeCl_2$ -------------- 42.7
Capacitance at —55° C.:
    Unit #5, LiCl ------------------------------ 21.3
    Unit #6, LiCl+$FeCl_3$ ---------------------- 32.2
    Unit #7, LiCl+$FeCl_3$+$FeCl_2$ -------------- 32.3

Gold cathode (Fine silver case plated with gold inside and out before assembly)

Capacitance at room temperature:
                                                      Mfd.
    Unit #8, LiCl ------------------------------ 39.0
    Unit #9, LiCl+$FeCl_3$ ---------------------- 43.8
    Unit #10, LiCl+$FeCl_3$+$FeCl_2$ ------------- 42.3
Capacitance at —55° C.:
    Unit #8, LiCl ------------------------------ 20.5
    Unit #9, LiCl+$FeCl_3$ ---------------------- 34.6
    Unit #10, LiCl+$FeCl_3$+$FeCl_2$ ------------- 30.7

In all of the above-identified capacitors, the concentration of the lithium chloride electrolyte was about 25% by weight.

From the foregoing tables, it is evident that the presence of iron chloride in lithium chloride electrolyte not only enhances the capacitance of the unit at room temperature but is especially beneficial at low temperatures.

Although the present invention has been disclosed in connection with a preferred embodiment thereof, variations and modifications may be resorted to by those skilled in the art without departing from the principles of the present invention. All of these variations and modifications are considered to be within the true spirit and scope of the present invention, as disclosed in the foregoing description and defined by the appended claims.

I claim:

1. An electrolytic capacitor comprising an anode of tantalum, a cathode selected from the group silver and gold, an electrolyte selected from the group consisting of aqueous solutions of alkali metal chlorides and of hydrochloric acid, and a depolarizer of a chloride of iron.

2. An electrolytic capacitor comprising an anode of tantalum, a cathode selected from the group silver and gold, an electrolyte composed of an aqueous solution of an alkali metal chloride, and a depolarizer of a chloride of iron dissolved in the electrolyte.

3. An electrolytic capacitor comprising an anode of tantalum, a cathode selected from the group silver and gold, an electrolyte composed of an aqueous solution of an alkali metal chloride, and a depolarizer of ferric chloride dissolved in the electrolyte.

4. An electrolytic capacitor comprising an anode of tantalum, a cathode selected from the group silver and gold, an electrolyte composed of an aqueous solution of an alkali metal chloride, and a depolarizer of ferric chloride and ferrous chloride dissolved in said electrolyte.

5. An electrolytic capacitor comprising an anode of tantalum, a cathode selected from the group silver and gold, an electrolyte composed of an aqueous solution of lithium chloride, and a depolarizer of a major amount of ferric chloride and of a minor amount of ferrous chloride dissolved in said electrolyte.

6. An electrolytic capacitor comprising an anode of tantalum, a cathode of silver, an electrolyte composed of an aqueous solution of lithium chloride, and a depolarizer of ferric chloride dissolved in said electrolyte.

7. An electrolytic capacitor comprising an anode of tantalum, a cathode of silver, an electrolyte composed of an aqueous solution of lithium chloride, and a depolarizer of ferric chloride having a concentration between 10 g. and 200 g. per liter dissolved in said electrolyte.

8. An electrolytic capacitor comprising an anode of porous tantalum, a cathode of silver, an electrolyte composed of an aqueous solution of lithium chloride, and a depolarizer dissolverd in said electrolyte, said depolarizer being composed of between 10 g. and 200 g. per liter of ferric chloride and between 1 g. and 10 g. per liter of ferrous chloride.

9. An electrolytic capacitor comprising an anode of tantalum, a cathode of gold, an electrolyte composed of an aqueuos solution of lithium chloride, and a depolarizer of ferric chloride dissolved in said electrolyte.

10. An electrolytic capacitor comprising an anode of porous tantalum, a cathode of gold, an electrolyte composed of an aqueous solution of lithium chloride, and a depolarizer dissolved in said electrolyte, said depolarizer being composed of between 10 g. and 200 g. per liter of ferric chloride and between 1 g. and 10 g. per liter of ferrous chloride.

11. An electrolytic capacitor comprising an anode of tantalum, a cathode selected from the group silver and gold, an electrolyte composed of an aqueous solution of hydrochloric acid, and a depolarizer of ferric chloride and ferrous chloride dissolved in said electrolyte.

12. An electrolytic capacitor comprising an anode of tantalum, a cathode selected from the group silver and gold, an electrolyte composed of an aqueous solution of hydrochloric acid, and a depolarizer of a major amount of ferric chloride and of a minor amount of ferrous chloride dissolved in said electrolyte.

References Cited in the file of this patent
UNITED STATES PATENTS

| | | |
|---|---|---|
| 2,368,688 | Taylor | Feb. 6, 1945 |
| 2,617,863 | Stinson | Nov. 11, 1952 |